No. 793,661. PATENTED JULY 4, 1905.
D. A. HITCHCOCK.
DRAFT RIGGING.
APPLICATION FILED JULY 30, 1904.
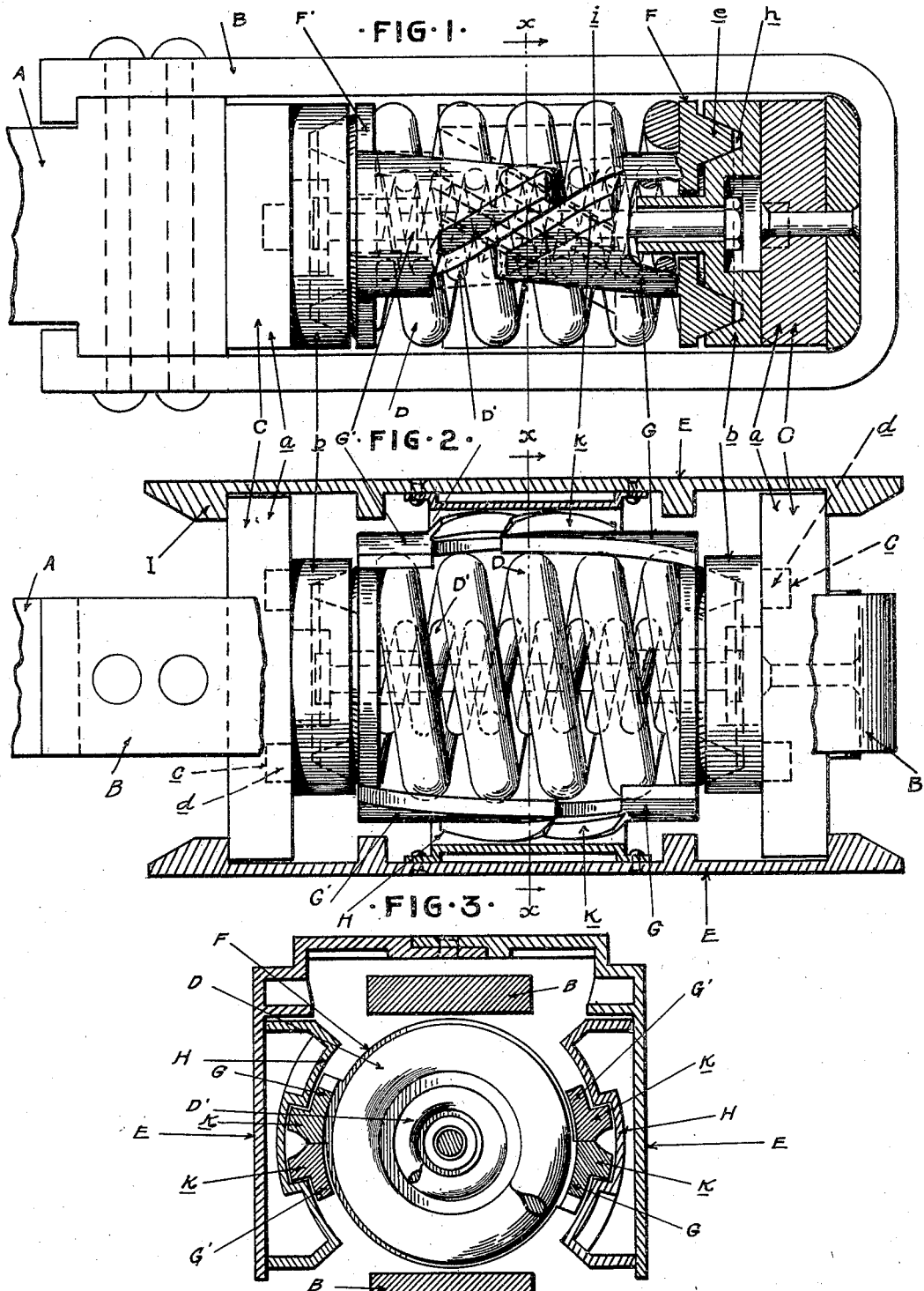
WITNESSES
INVENTOR
DWIGHT·A·HITCHCOCK·
BY
ATT'Y.

No. 793,661.

Patented July 4, 1905.

UNITED STATES PATENT OFFICE.

DWIGHT A. HITCHCOCK, OF DETROIT, MICHIGAN, ASSIGNOR TO MONARCH COUPLER COMPANY, LIMITED, OF DETROIT, MICHIGAN.

DRAFT-RIGGING.

SPECIFICATION forming part of Letters Patent No. 793,661, dated July 4, 1905.

Application filed July 30, 1904. Serial No. 218,828.

*To all whom it may concern:*

Be it known that I, DWIGHT A. HITCHCOCK, a citizen of the United States, residing at Detroit, in the county of Wayne and State of Michigan, have invented certain new and useful Improvements in Draft-Rigging, of which the following is a specification, reference being had therein to the accompanying drawings.

The invention relates to an improved draft-rigging, comprising followers having inwardly-projecting wings upon the sides designed to guide the partial rotation of the followers to produce by such rotation a frictional resistance.

The invention further consists in constructing the followers with the wings only on the sides, so that the yoke may be placed above or below the springs in close proximity thereto, as in the manner of placing the yoke in relation to the springs in a standard draft-rigging in which no turning movement of the followers is produced.

The invention further consists in the peculiar arrangement, construction, and combination of the various parts, as more fully hereinafter described, and particularly pointed out in the claims.

In the drawings, Figure 1 is a side elevation of the yoke and the followers therein, the portion at the right-hand end of the view being in section. Fig. 2 is a top plan view of the followers, showing the side plates and cheek-plates in section, the yoke being broken away to better illustrate the parts. Fig. 3 is a vertical section on line X X, Figs. 1 and 2.

A is the draft-bar, B the yoke on the draft-rigging, the yoke and draft-bar being of no unusual construction.

C represents non-rotatable followers at opposite ends of the yoke.

D D' are two interposed springs.

E represents the two side plates.

In this construction I have shown the non-rotatable member C, made up of two parts $a$ and $b$, the member $a$ having a suitable socket $c$, in which engage lugs $d$, formed on the members $b$. It is immaterial, so far as the construction of the rotating feature of my invention is concerned, whether the member C is made up of one or two parts; but I prefer to make it of two parts, so that the member $b$ may be replaced in case of undue wear.

F F' are two rotatable followers against which the opposite ends of the springs D D' abut. These followers F F' preferably have V-shaped ribs $e$ on their outer faces, engaging the corresponding V-shaped groove $h$ in the member $b$ of the non-rotatable follower C. This construction forms no part of my present invention, as I have made it the subject-matter of another application. It is simply desirable to increase the friction and as far as this invention is concerned may or may not be employed, as desired. Each of the followers F F' is provided upon opposite sides with the inwardly-projecting wings G G', which are provided with complementary or inclined spiral faces $i$, which are adapted to contact, as shown in Fig. 1. These wings project from the followers only at opposite sides, leaving the space above and below the springs free, so that the yoke may pass above and below the springs in close proximity thereto, as in the ordinary manner where non-rotating followers are employed, the purpose of this being so that the standard yoke and springs may be employed and yet obtain the frictional resistance produced by the partial rotations of the followers themselves. Upon the outer faces of the wings G G' are the spiral flanges $k$, which are adapted to engage in corresponding guideways in the cheek-plates H, which are attached to or formed integral with the side plates E.

The parts being thus constructed, their operation is as follows: Supposing the draft-bar to be drawn to the left, Fig. 1, the yoke will be correspondingly moved, the left-hand follower-plate abut against the usual shoulders I, and the side plates will be held stationary, while the right-hand follower-plates C will be moved to the left and the springs compressed. In this movement the followers F F' will be partially rotated by the engagement of the spiral contacting faces $i$, and the compression of the spring will be resisted by the frictional contact during the rotation of the followers F F' and the members $b$. When the draft-bar A returns to the right to its normal position, the flanges $k$ on the wings G G', engaging in the guideways of the cheek-plates H, will rotate the followers back to the normal position (shown in Fig. 1) ready for another operation. The same result will be produced if the draft-bar is moved to the right, except that in this case the left-hand follower will be moved endwise, while the right-hand follower will not travel.

What I claim as my invention is—

1. In a draft-rigging, the combination of followers, an interposed spring, projecting wings on the sides of the followers having inclined contacting faces, and complementary stationary inclines, with which portions of the wings have bearing, for the purpose described.

2. In a draft-rigging, the combination of cheek-plates having inclined bearings, the yoke, the spring within the yoke between the cheek-plates, followers at opposite ends of the spring, and inwardly-projecting wings on the sides of the followers, having oppositely-inclined, contacting faces, and having portions engaging the inclined bearings in the cheek-plates.

3. In a draft-rigging, the combination of a spring, a yoke inclosing the spring and passing above and below it in close proximity thereto, followers at each end of the spring, inwardly-projecting wings at the sides only of the followers, said wings having inclined contacting faces, and cheek-plates having complementary inclined bearings with which portions of the wings engage.

4. In a draft-rigging, the combination of a spring, a yoke inclosing the spring, passing above and below it in close proximity, followers at each end of the spring, and inwardly-projecting wings on the followers having engaging spirally-inclined friction-faces, said wings being at the sides only of the spring.

In testimony whereof I affix my signature in presence of two witnesses.

DWIGHT A. HITCHCOCK.

Witnesses:
H. C. SMITH,
E. D. AULT.